(12) United States Patent
Sato et al.

(10) Patent No.: US 9,289,838 B2
(45) Date of Patent: Mar. 22, 2016

(54) GUIDE ROLLER

(75) Inventors: Katsuhiko Sato, Sagamihara (JP);
Tomio Watanabe, Sagamihara (JP)

(73) Assignee: Miki Pulley Co., Ltd., Kanagawa (JP)

( * ) Notice: Subject to any disclaimer, the term of this patent is extended or adjusted under 35 U.S.C. 154(b) by 799 days.

(21) Appl. No.: 13/261,276

(22) PCT Filed: Oct. 26, 2010

(86) PCT No.: PCT/JP2010/006332
§ 371 (c)(1),
(2), (4) Date: Apr. 26, 2012

(87) PCT Pub. No.: WO2011/052193
PCT Pub. Date: May 5, 2011

(65) Prior Publication Data
US 2012/0208685 A1    Aug. 16, 2012

(30) Foreign Application Priority Data

Oct. 30, 2009  (JP) ................................ 2009-249705

(51) Int. Cl.
*F16J 15/32*    (2006.01)
*B23D 57/00*    (2006.01)

(52) U.S. Cl.
CPC ......... *B23D 57/0053* (2013.01); *F16J 15/3264* (2013.01); *Y10T 29/49544* (2015.01)

(58) Field of Classification Search
CPC ........................ F16J 15/3264; F16J 15/3244
USPC ................................................ 492/47, 27
See application file for complete search history.

(56) References Cited

U.S. PATENT DOCUMENTS

| | | | | |
|---|---|---|---|---|
| 3,537,631 A | * | 11/1970 | Fujii | 226/191 |
| 4,136,748 A | * | 1/1979 | Dickerhoff | E21B 10/22 |
| | | | | 175/337 |
| 4,277,114 A | * | 7/1981 | Lindegger | B65G 39/09 |
| | | | | 277/420 |
| 4,813,113 A | * | 3/1989 | Wykes et al. | 492/1 |
| 4,817,410 A | * | 4/1989 | Yatsuzuka et al. | 72/199 |
| 5,238,166 A | * | 8/1993 | Schwarstein | F16J 15/4472 |
| | | | | 277/412 |
| 6,004,249 A | * | 12/1999 | Blais | 492/20 |
| 6,098,610 A | * | 8/2000 | Egglhuber | B23D 57/0053 |
| | | | | 125/16.01 |
| 2003/0040368 A1 | * | 2/2003 | Schultze | F16D 3/385 |
| | | | | 464/131 |
| 2007/0085276 A1 | * | 4/2007 | Hartmann et al. | 277/349 |
| 2011/0150380 A1 | * | 6/2011 | Walter et al. | 384/484 |

FOREIGN PATENT DOCUMENTS

| | | |
|---|---|---|
| DE | 3908374 A1 | 10/1989 |
| JP | S27-501 Y | 1/1952 |
| JP | S38602 Y * | 1/1952 |
| JP | S35-23025 Y | 9/1960 |
| JP | 10-058439 A | 3/1998 |
| JP | 2004-314227 A | 11/2004 |
| JP | 2007-276029 A | 10/2007 |
| JP | 2008-068332 A | 3/2008 |
| JP | 2009-131932 A | 6/2009 |

* cited by examiner

*Primary Examiner* — Jacob Cigna
(74) *Attorney, Agent, or Firm* — Marshall & Melhorn, LLC

(57) ABSTRACT

Disclosed is a guide roller wherein bearings are held in a housing, and liquid mixed with abrasive grains is prevented from entering the interior of the housing through a small hole, thereby improving service life. The guide roller is configured to comprise a housing wherein the bearings are held in the housing, and the housing has a shaft hole wherein a support shaft is inserted that is installed upon the bearings. The shaft hole is formed to have a tapered wall, and the diameter of the hole decreases continuously toward the interior of the housing.

7 Claims, 6 Drawing Sheets left ← → right

GUIDE ROLLER

TECHNICAL FIELD

The present invention relates to a guide roller including a bearing received within a housing, and in particular to a guide roller suitable for applying a tension to a wire of a wire saw.

BACKGROUND OF THE INVENTION

Conventionally, the wire saw is known as a means for cutting a work made of hard and brittle material (such as a silicon ingot and a glass article). See patent document 1. A work can be cut or grooved by applying a running wire passed around a pulley unit under an appropriate tension to the work while feeding cutting fluid containing an abrasive to the part to be cut. The cutting fluid may not contain an abrasive if the wire saw is embedded with an abrasive.

PRIOR ART DOCUMENT(S)

Patent document 1: JP 2008-068332A

BRIEF SUMMARY OF THE INVENTION

Task to be Accomplished by the Invention

In a conventional wire saw, the cutting fluid mixed with an abrasive (which is intentionally added to the cutting fluid or dislodged from the wire) may seep or otherwise intrude into the housing of the guide roller containing a bearing, and the resulting reduction in the life of the bearing causes an increase in the running cost of the wire saw.

The present invention was made in view of such a problem of the prior art, and has a primary object to provide a guide roller that can prevent the intrusion of cutting fluid mixed with an abrasive into the housing thereof containing a bearing, and thereby improve the service life of the bearing.

Means to Achieve the Task

To achieve such an object, according to a first aspect of the present invention, the present invention provides a guide roller, comprising: a bearing (2, 3), and a housing (4) containing the bearing therein and provided with a shaft hole (50) for receiving a support shaft (6) to be supported by the bearing; wherein the shaft hole is defined by a tapered wall surface that progressively decreases in diameter toward inside the housing.

According to a second aspect of the present invention, the support shaft is provided with an annular projection (65, 66) extending circumferentially along an outer surface thereof and projecting toward the tapered wall.

According to a third aspect of the present invention, the guide roller further comprises a cover member (71) attached to the support shaft and overlies the shaft hole as seen in an axial direction.

According to a fourth aspect of the present invention, the housing is provided with an annular stepped portion (17, 18) along an outer circumference thereof, and the annular stepped portion is provided with a tapered outer circumferential surface (17b, 18b) that progressively increases in diameter axially toward outside the housing.

According to a fifth aspect of the present invention, the housing is provided with an annular protrusion (91) surrounding an opening of the shaft hole and protruding in a direction opposite to that for introducing the support shaft into the housing.

According to a sixth aspect of the present invention, the annular protrusion is provided with a tapered inner circumferential surface (91b) that progressively increases in diameter axially toward outside the housing.

Effect of the Invention

According to the first aspect of the present invention, the fluid mixed with an abrasive that is about to intrude into the housing from the shaft hole is guided to the exterior of the housing along the tapered wall surface of the shaft hole by the centrifugal force created by the rotation of the housing. Therefore, the intrusion of fluid mixed with an abrasive into the housing from the shaft hole can be prevented, and the service life of the bearing is maximized.

According to the second aspect of the present invention, the fluid mixed with an abrasive that is about to intrude into the housing along the outer circumferential surface of the support shaft is initially guided onto the tapered wall surface of the shaft hole by the annular projection and thence to the exterior of the housing via the tapered wall surface. Therefore, the intrusion of fluid mixed with an abrasive into the housing can be effectively prevented.

According to the third aspect of the present invention, by covering the shaft hole with the cover member, the intrusion of fluid mixed with an abrasive into the shaft hole can be prevented so that the intrusion of fluid mixed with an abrasive into the housing can be effectively prevented.

According to the fourth and fifth aspects of the present invention, the fluid mixed with an abrasive is prevented from intruding into the shaft hole via the outer circumferential surface of the housing and the side end surface of the housing in an effective manner.

According to the sixth aspect of the present invention, the fluid mixed with an abrasive that is about to intrude into the inside of the annular protrusion is guided out of the housing along the tapered inner circumferential surface of the annular protrusion so that the intrusion of the fluid mixed with an abrasive into the shaft hole can be effectively prevented.

DETAILED DESCRIPTION OF THE PREFERRED EMBODIMENTS

First Embodiment

Figure 1:
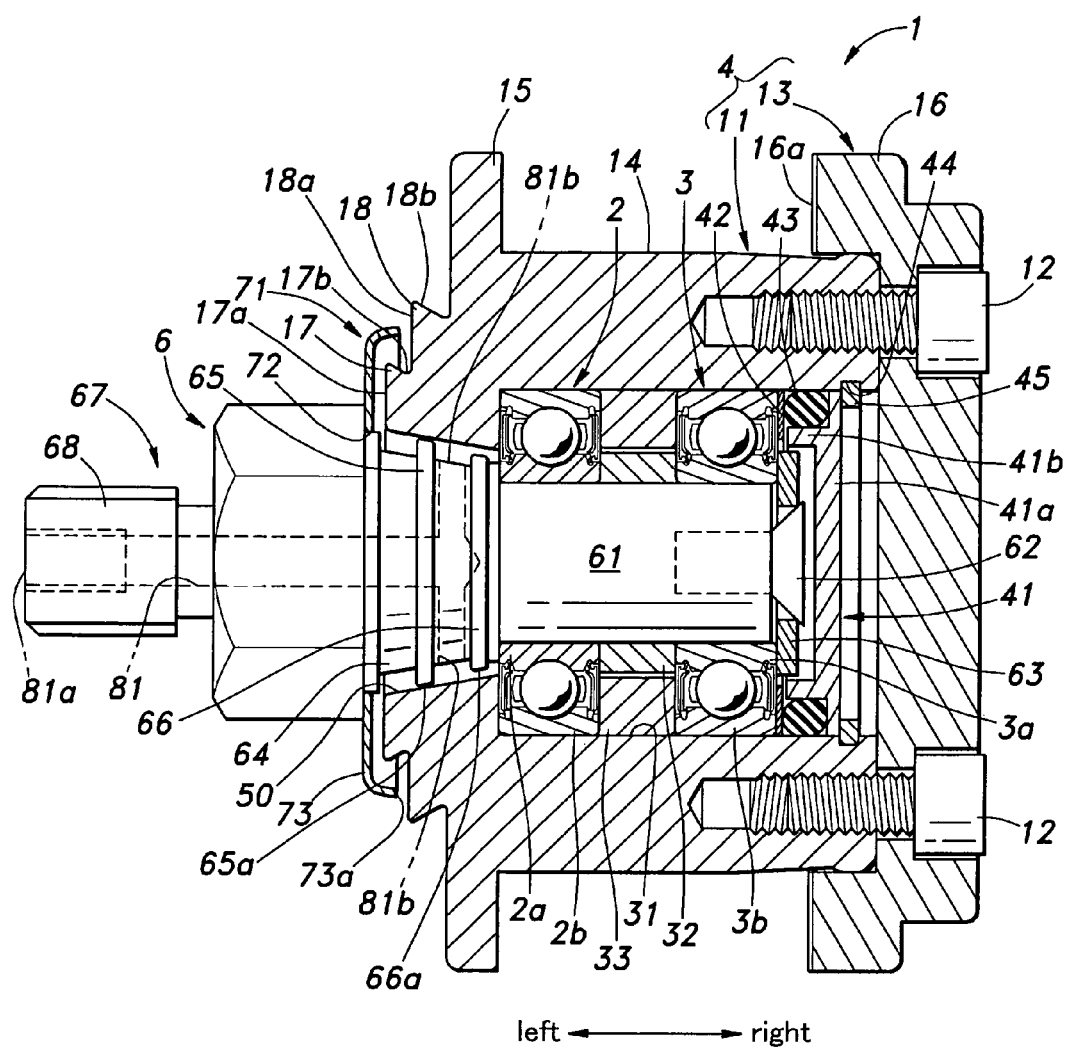
FIG. 1 is a longitudinal section view of a guide roller given as a first embodiment of the present invention.
Figure 2:
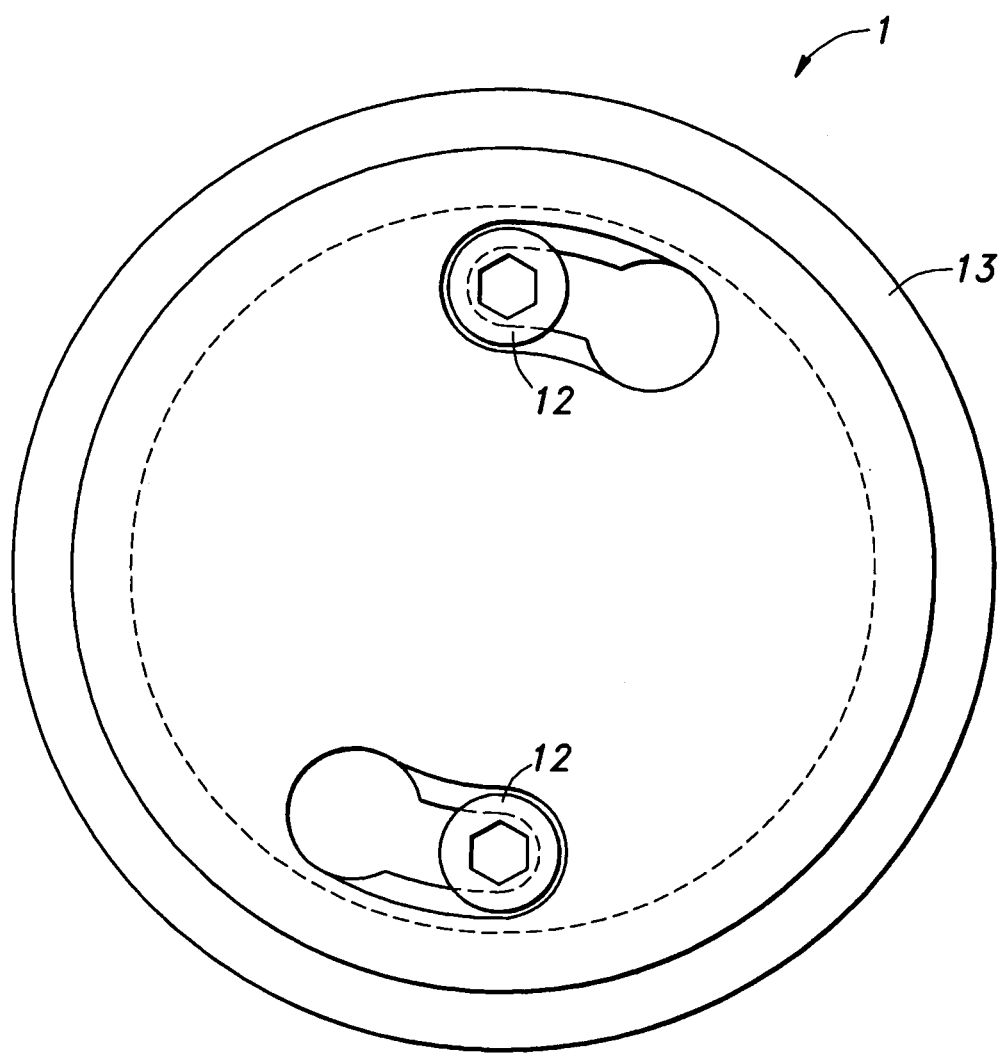
FIG. 2 is a side end view of the guide roller of the first embodiment.
Figure 3:
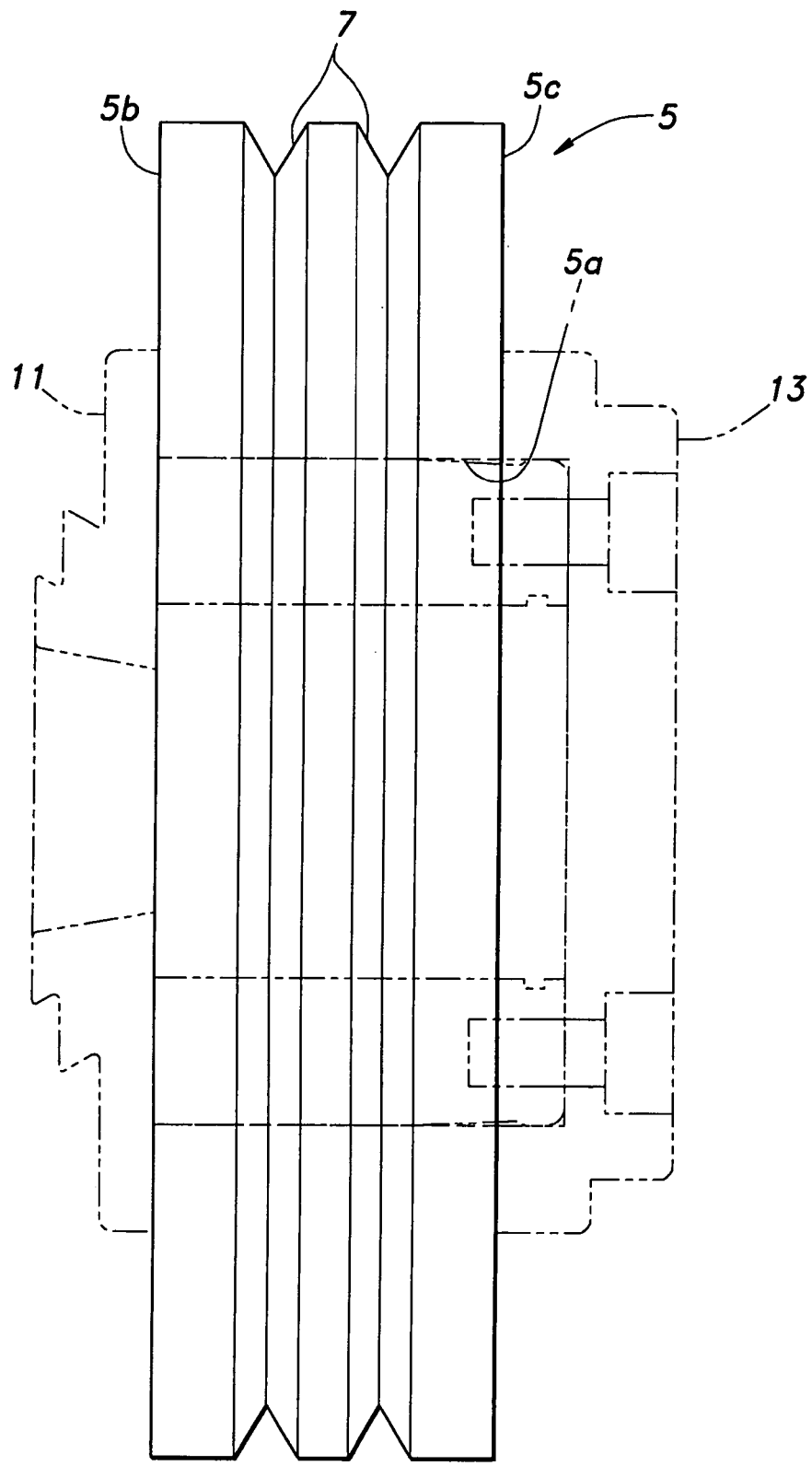
FIG. 3 is a front end view of a pulley main body configured to the attached to the guide roller of the first embodiment.

Referring to FIGS. 1 to 4, a guide roller given as a first embodiment of the present invention is described in the following. In the following description, the "left hand side" and the "right hand side" as used in the following description are based on the orientation of the guide roller as illustrated in FIG. 1, and the left to right direction is referred to as the axial direction.

The guide roller 1 is designed to apply a tension to a cutting wire used for cutting a work by using a wire saw not shown in the drawing, and comprises a housing 4 receiving a pair of bearings 2 and 3 therein, a pulley main body 5 (see FIG. 3) secured to the outer periphery of the housing 4 and a support shaft 6 rotatably supporting the housing 4. A pair of wires not shown in the drawing are passed around the two wire grooves 7 formed circumferentially in the outer circumferential surface of the pulley main body 5.

The housing 4 comprises a substantially cylindrical housing main body 11 and an end cap 13 connected to an end of the housing main body 11 by using threaded bolts 12. The pulley main body 5 is attached to the housing 4 by fitting a barrel part 14 of the housing main body 11 into a mounting hole 5a of the pulley main body 5 and attaching the end cap 13 to the right end of the barrel part 14. At this time, the pulley main body 5 is fixedly clamped at two side surfaces 5b and 5c thereof by a flange part 15 formed on the left end of the barrel part 14 and an annular support part 16 formed in the end cap 13.

The part of the housing 4 to the left of the flange part 15 on the outer circumference of the flange part 15 is formed with a first annular stepped portion 17 and a second annular stepped portion 18 each shaped like a base end of a cone in a terraced arrangement. The second annular stepped portion 18 is reduced in diameter as compared with the flange part 15 (or relatively closer to the center of the housing 4), and the first annular stepped portion 17 is provided as a part having a reduced diameter as compared with the second annular stepped portion 18. Each of the first and second annular stepped portions 17 and 18 is provided with an annular axial end surface 17a, 18a extending perpendicularly to the axial line, and a tapered outer circumferential surface 17b, 18b progressively increasing in diameter in the axially outer direction. Therefore, in the vertical sectional view shown in FIG. 1, each annular stepped portion 17, 18 is provided with a pair of radially outwardly directed tip defined by the annular axial end surface 17a, 18a and the tapered outer circumferential surface 17b, 18b intersecting at an acute angle.

Figure 4:
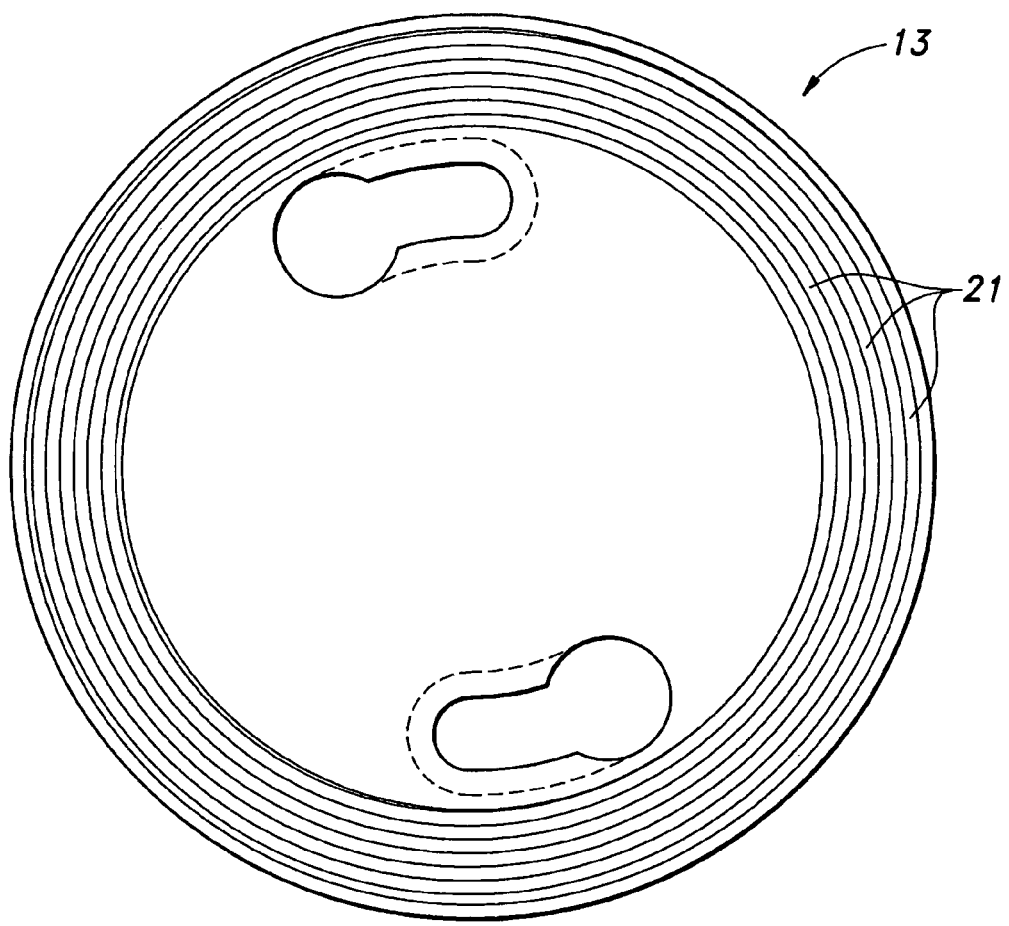
FIG. 4 is a side end view of an end cap of the guide roller of the first embodiment.

A contact surface 16a of the annular support part 16 of the end cap 13 configured to engage the opposing side surface 5c of the pulley main body 5 is formed with a spiral groove 21 as shown in FIG. 4 so that the pulley main body 5 may be fixedly secured in a reliable manner. More specifically, the pulley main body 5 made of relatively soft material such as urethane to minimize the possibility of breaking the wire may decrease in thickness when turned at high speed owing to the centrifugal force, but the presence of the spiral groove 21 prevents the slipping of the pulley main body 5 relative to the housing 4 even in such a case. A plurality of concentric grooves may also be formed instead of the spiral groove 21 to achieve the same goal.

Each of the bearings 2 and 3 consists of an identical double shield deep-groove ball bearing, and is press fitted into a bearing retaining chamber 31 defined by the inner circumferential surface of the housing main body 11. An inner collar 32 is interposed between the inner race 2a of the bearing 2 and the inner race 3a of the bearing 3 in a rotationally fast manner with respect to the both inner races 2a and 3a. An outer collar 33 is interposed between the outer race 2b of the bearing 2 and the outer race 3b of the bearing 3 so as to surround the inner collar 32. The bearings 2 and 3 are thereby axially spaced apart by a prescribed distance by the two collars 32 and 33 in a stable manner. The radial thickness of each of the inner collar 32 and the outer collar 33 is selected so as to minimize the gap between the outer circumferential surface of the inner collar 32 and the inner circumferential surface of the outer collar 33. Thereby, even when the internal pressure of the guide roller 1 is caused to drop owing to the drop in the temperature of the air inside the guide roller 1 following the cessation of the rotation of the guide roller 1, the drawing of the cutting fluid mixed with an abrasive into the guide roller 1 from outside can be minimized.

The right end of the bearing retaining chamber 31 defined inside the housing main body 11 is closed by a plug member 41 which comprises a circular disk part 41a and an annular projection 41b projecting leftward from the disk part 41a so as to define a retaining space for an O-ring 43 jointly with the inner circumferential surface of the housing main body 11 and an annular support plate 42. The plug member 41 and the O-ring 43 jointly prevent intrusion of cutting fluid mixed with an abrasive from intruding into the bearing retaining chamber 31 from the side of the end cap 13. The rightward displacement of the plug member 41 is prevented by a stop ring 45 received in an circumferential groove 44 formed in the housing main body 11.

The housing main body 11 is provided with a shaft hole 50 that opens at the left side end wall of the housing main body 11 and communicates with the interior of the bearing retaining chamber 31 to permit the introduction of the support shaft 6 into the bearing retaining chamber 31 to be supported by the bearings 2 and 3. The shaft hole 50 is defined by the tapered inner circumferential wall surface of the housing main body 11 that progressively diminishes in diameter toward inside the housing main body 11.

The support shaft 6 is provided with a journal portion 61 at a free end thereof which is fitted into the inner races 2a and 3a of the bearings 2 and 3. The axial end of the journal portion 61 is fixedly attached to a fixing ring 63 by using a fixing screw 62 so that the bearings 2 and 3 are clamped between the fixing ring 63 and the front end surface of the tapered enlarged diameter portion 64 located to the rear of the journal portion 61. The tapered enlarged diameter portion 64 is given with a tapered shape that progressively decreases in diameter toward the journal portion 61, and is provided with a first annular projection 65 and a second annular projection 66 in an axially spaced apart relationship. The outer circumferential surface 65a, 66a of each annular projection 65, 66 is tapered at a same angle as the wall surface of the shaft hole 50. The head 67 of the support shaft 6 is provided with a threaded connecting part 68 projecting therefrom for connection with a guide roller support mechanism not shown in the drawings.

The left end of the tapered enlarged diameter portion 64 of the support shaft 6 is fitted with a cover member 71 overlying the shaft hole 50. The cover member 71 covers the entire shaft hole 50 in cooperation with the support shaft 6. The cover member 71 is centrally provided with a mounting hole 72 which receives the tapered enlarged diameter portion 64 therein. The cover member 71 is provided with a larger diameter than the first annular stepped portion 17, and is curved toward the housing main body 11 along the outer periphery 73 thereof so as to cover the first annular stepped portion 17. The outer peripheral edge 73a of the outer periphery part 73 is located adjacent to the axial end surface 18a of the second annular stepped portion 18.

The guide roller 1 discussed above may be used in an environment exposed to cutting fluid mixed with an abrasive used in association with a wire saw. The fluid that may intrude into the shaft hole 50 from the outer periphery of the housing 4 is thrown radially outward (or radially away from the shaft hole 50) by the centrifugal force that is created by the rotation of the housing 4 and acts upon the fluid as it passes along the first and second annular stepped portions 17 and 18. The fluid that is directed into the shaft hole 50 from the side end (or the left end part) of the housing 4 is blocked by the cover member 71. If the fluid is introduced into the shaft hole 50 via the gap between the housing main body 11 and the cover member 71, the fluid is thrown out of the housing 4 (or leftward) along the slanted wall surface of the shaft hole 50.

The fluid that may pass through the gap between the housing main body 11 and the cover member 71, and then intrude into the shaft hole 50 via the outer circumferential surface of the support shaft 6 is also guided by the first and second annular projections 65 and 66 provided on the support shaft 6 onto the wall surface of the shaft hole 50, and thence to outside the housing 4.

An air pressure supply passage 81 is formed within the support shaft 6 for supplying air to the bearings 2 and 3. The air pressure supply passage 81 extends from an opening 81a formed in the threaded connecting part 68 to a pair of openings 81b formed on a part of the tapered enlarged diameter portion 64 located between the first and second annular projections 65 and 66.

The outer circumferential surface 65a of the first annular projection 65 is located adjacent to the wall surface of the shaft hole 50 while the outer circumferential surface 66a of the second annular projection 66 is located more spaced from the wall surface of the shaft hole 50. Therefore, the air is allowed to be supplied from the openings 81b without being obstructed so that the intrusion of the fluid into the bearing retaining chamber 31 via the outer circumferential surface of the support shaft 6 can be avoided. By supplying air in this fashion, not only the centrifugal force but also the air pressure promotes the reversing of the intruding flow of the fluid out of the housing 4, and prevents the intrusion of the fluid into the bearing retaining chamber 31.

In this case, it is also possible to supply oil mist (air mixed with a lubricant) into the housing 4 via the air pressure supply passage 81. If oil mist is used for lubrication, the supply of lubricating oil into the housing 4 is enabled even when the housing 4 is in rotation without being hindered by the centrifugal force. Also, the space between the wall surface of the shaft hole 50 and the outer circumferential surface of the tapered enlarged diameter portion 64 of the support shaft 6 is filled with the oil mist, and this is also effective in preventing the intrusion of the fluid into this space. Also, when oil mist is used, the temperature drop following the cessation of the rotation of the guide roller 1 causes a relatively small drop in the internal air pressure so that the drawing of the fluid into the housing 4 from outside owing to the drop in the internal pressure can be effectively avoided. The use of oil mist provides the further advantage of preventing the rusting of the bearings 2 and 3.

Second Embodiment

Figure 5:
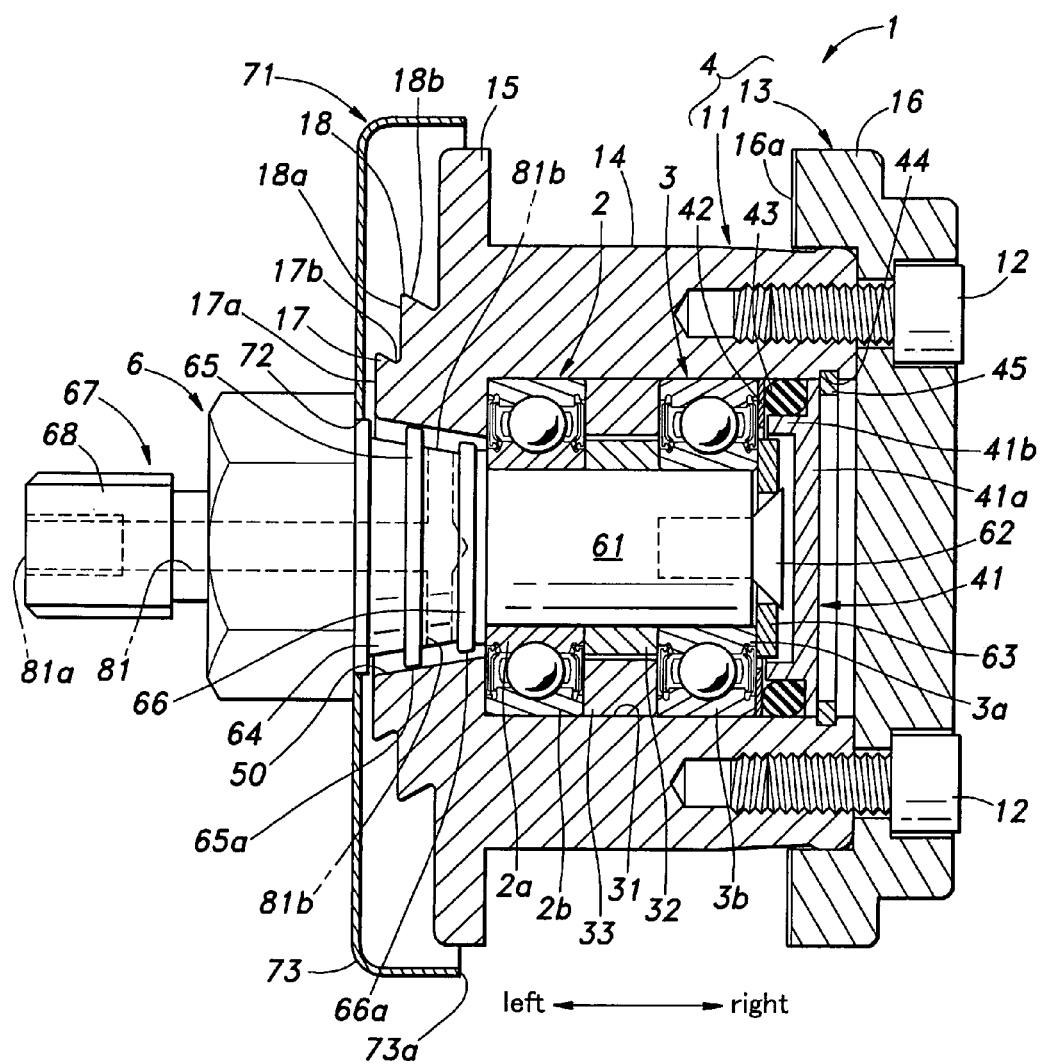
FIG. 5 is a longitudinal section view of a guide roller given as a second embodiment of the present invention.

A guide roller given as a second embodiment of the present invention is described in the following with reference to FIG. 5. In the second embodiment, the parts corresponding to those of the first embodiment are denoted with like numerals without repeating the description of such parts.

The guide roller 1 of the second embodiment is similar to the guide roller of the first embodiment except for the structure of the cover member 71. Referring to FIG. 5, the cover member 71 of the second embodiment is provided with a larger diameter than the flange part 15. More specifically, an outer periphery part 73 of the cover member 71 covers not only the first and second annular stepped portions 17 and 18 but also the flange part 15, and curves toward the housing main body 11. The outer peripheral edge 73a of the outer periphery part 73 is positioned in an axially middle part of the flange part 15. By increasing the area of the housing main body 11 covered by the cover member 71, the intrusion of fluid mixed with an abrasive into the bearing retaining chamber 31 can be prevented even more effectively.

Third Embodiment

A guide roller given as a third embodiment of the present invention is described in the following with reference to FIG. 6. In the third embodiment, the parts corresponding to those of the first embodiment are denoted with like numerals without repeating the description of such parts.

The guide roller 1 of the third embodiment is similar to the guide roller of the first embodiment except for the changes made to the first and second annular stepped portions 17 and 18 of the first embodiment (See FIG. 1) to prevent the intrusion of fluid mixed with an abrasive. More specifically, as illustrated in FIG. 6, an annular protrusion 91 is formed on the left side end of the housing 4 so as to surround the opening of the shaft hole 50, and projects away from the housing 4 (leftward). The outer circumferential surface 91a of the annular protrusion 91 is continuously connected to the barrel part 14 of the housing main body 11 via the flange part 15. The inner circumferential surface 91b of the annular protrusion 91 is tapered so as to progressively increase in diameter toward the outside of the housing main body 11. The cover member 71 is provided opposite to the inner circumferential surface of the annular protrusion 91, and the free end 91c of the annular protrusion 91 extends leftward beyond the cover member 71. The outer peripheral edge 73a of the outer periphery 73 of the cover member 71 is loosely received in an annular groove 92 formed inside the annular protrusion 91.

In the guide roller 1 of the third embodiment, the fluid mixed with an abrasive intruding into shaft hole 50 from the outer periphery of the housing 4 is guided radially outward (or away from the shaft hole 50) as the fluid advances across the annular protrusion 91 provided at the opening end of the shaft hole 50 under the centrifugal force caused by the rotation of the housing 4. In particular, the fluid that has reached inside the annular protrusion 91 (or the gap between the annular protrusion 91 and the cover member 71) is guided along the tapered inner circumferential surface 91b to the free end 91c of the annular protrusion 91 (outward from the housing 4) so that the intrusion of the fluid into the shaft hole 50 can be effectively prevented.

Figure 6:
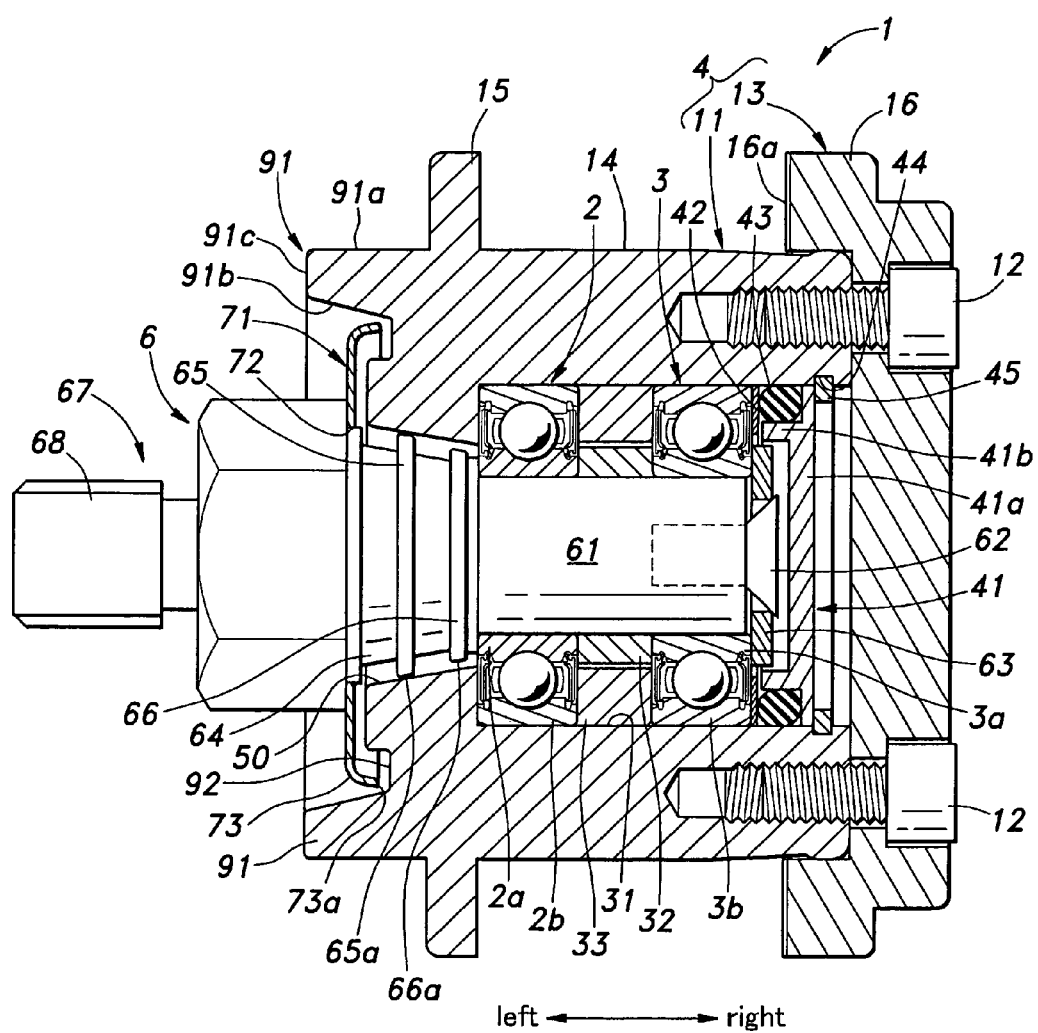
FIG. 6 is a longitudinal section view of a guide roller given as a third embodiment of the present invention.

The air pressure supply passage 81 (See FIG. 1) was omitted in the guide roller 1 of the third embodiment illustrated in FIG. 6. According to this arrangement, the intrusion of cutting fluid mixed with an abrasive can be effectively prevented as compared to the conventional guide roller even when the air pressure supply passage 81 is omitted. By omitting the air pressure supply passage 81, the need for the arrangement for supplying air can be eliminated, and the running cost such as the cost of electric power and the impact on the environment can be reduced. The air pressure supply passage 81 may be omitted also in the first and/or second embodiments similarly as in the third embodiment.

Although the present invention has been described in terms of preferred embodiments thereof, it is obvious to a person skilled in the art that various alterations and modifications are possible without departing from the scope of the present invention which is set forth in the appended claims. For instance, the guide roller of the present invention is effective in preventing the intrusion of not only cutting fluid mixed with an abrasive but also water and other fluids into the bearing retaining chamber 31. The layout and number of the annular stepped portions in the housing main body 11, and the layout and number of the annular projections of the support shaft can be freely modified without departing from the spirit of the present invention.

It should also be noted that the various components of the guide rollers of the different embodiments are not necessarily essential for the implementation of the present invention, but may be modified or omitted without departing from the spirit of the present invention. For instance, the annular projections formed on the support shaft, the cover member mounted on the support shaft and other components of the embodiment may be omitted when desired.

GLOSSARY 1 guide roller
2, 3 bearing
4 housing
5 pulley main body
6 support shaft
11 housing main body
13 end cap
14 barrel part
15 flange part
16 annular support part
17 first annular stepped portion
18 second annular stepped portion
31 bearing retaining chamber
50 shaft hole
61 journal portion
64 tapered enlarged diameter portion
65 first annular projection
66 second annular projection
71 cover member
91 annular protrusion
91b inner circumferential surface

The invention claimed is:

1. A guide roller, comprising:
    a bearing; and
    a housing containing the bearing therein and provided with a shaft hole for receiving a support shaft to be supported by the bearing;
    wherein the shaft hole is defined by a tapered wall surface that progressively decreases in diameter toward inside the housing;
    wherein the support shaft has a tapered enlarged diameter portion;
    wherein the tapered enlarged diameter portion has first and second portions, the first portion being provided with an annular projection extending circumferentially along an outer circumferential surface of the tapered enlarged diameter portion and projecting from the outer circumferential surface toward the tapered wall surface, and an outer circumferential surface of the second portion of the tapered enlarged diameter portion of the support shaft progressively decreasing in diameter toward inside the housing; and
    wherein an outer circumferential surface of the annular projection and the outer circumferential surface of the second portion of the tapered enlarged diameter portion of the support shaft are tapered at a substantially same angle as the tapered wall surface of the shaft hole.

2. The guide roller according to claim 1, further comprising a cover member attached to the support shaft and overlying the shaft hole as seen in an axial direction.

3. The guide roller according to claim 1, wherein the housing is provided with an annular stepped portion along an outer circumference thereof, and the annular stepped portion is provided with a tapered outer circumferential surface that progressively increases in diameter axially toward outside the housing.

4. The guide roller according to claim 1, wherein the housing is provided with an annular protrusion surrounding an opening of the shaft hole and protruding in a direction opposite to that for introducing the support shaft into the housing.

5. The guide roller according to claim 4, wherein the annular protrusion is provided with a tapered inner circumferential surface that progressively increases in diameter axially toward outside the housing.

6. A guide roller, comprising:
    a bearing, and
    a housing containing the bearing therein and provided with a shaft hole for receiving a support shaft to be supported by the bearing;
    wherein the shaft hole is defined by a tapered wall surface that progressively decreases in diameter toward inside the housing,
    wherein the support shaft is provided with a first annular projection extending circumferentially along an outer surface thereof and projecting toward the tapered wall, and
    wherein the support shaft is further provided with an air pressure supply passage for supplying air to the bearing, the air pressure supply passage having a first opening that opens out in an axial end surface of the support shaft and a second opening that opens out in the outer surface of the support shaft at a position axially inward of the first annular projection.

7. The guide roller according to claim 6, wherein the support shaft is further provided with a second annular projection extending circumferentially along the outer surface thereof and projecting toward the tapered wall at a position axially inward of the first annular projection, an outer circumferential surface of the second annular projection being located more spaced from the tapered wall surface of the shaft hole than an outer circumferential surface of the first annular projection is from the tapered wall surface, and wherein the second opening of the air pressure supply passage opens out in the outer surface of the support shaft at a position axially between the first annular projection and the second annular projection.

* * * * *